(12) United States Patent
Griffin

(10) Patent No.: US 6,485,008 B1
(45) Date of Patent: Nov. 26, 2002

(54) JOUNCE BUMPER

(75) Inventor: Gary J. Griffin, Fraser, MI (US)

(73) Assignee: Edwards Industries, Royal Oak, MI (US)

( * ) Notice: Subject to any disclaimer, the term of this patent is extended or adjusted under 35 U.S.C. 154(b) by 0 days.

(21) Appl. No.: 10/057,070

(22) Filed: Jan. 26, 2002

(51) Int. Cl.$^7$ ................................................ F16F 9/00
(52) U.S. Cl. ...................................... 267/220; 267/153
(58) Field of Search ............................... 267/33, 34, 35, 267/153, 219–221, 286, 287; 280/124.177, 124.178, 124.179

(56) References Cited

U.S. PATENT DOCUMENTS 4,962,916 A * 10/1990 Palinkas ..................... 267/153
5,052,665 A * 10/1991 Sakuragi ..................... 267/220
5,257,730 A * 11/1993 Nakaura ...................... 267/220
5,467,970 A * 11/1995 Ratu et al. ................... 267/220
5,725,203 A * 3/1998 Lloyd ......................... 267/153
6,158,726 A * 12/2000 Coleman et al. ............ 267/292

* cited by examiner

Primary Examiner—Christopher P. Schwartz
(74) Attorney, Agent, or Firm—Stevens, Davis, Miller & Mosher, LLP

(57) ABSTRACT

An automotive suspension assembly providing a jounce stop arrangement. The elastic bumper is placed into a flexible cup. The flexible cup connects to the surface of the cylinder of a strut assembly or other assembly. Upon application of a force upon the elastic bumper, the elastic bumper collapses into the flexible cup. The flexible cup also expands in reaction to the force upon the elastic bumper. The assembly provides dual system of absorbing the energy from an impact in the combination of collapsing and expanding of the elastic bumper and flexible cup.

17 Claims, 4 Drawing Sheets

JOUNCE BUMPER

This invention relates to a jounce bumper for motor vehicle suspensions systems either in the strut assemblies or other locations.

BACKGROUND OF INVENTION

Microcellular urethane bumpers are used in vehicle suspensions to absorb energy during jounce and to act as a supplemental spring. These could be mounted on a strut assembly, as own in the U.S. Pat. No. 5,487,535, where the bumper surrounds the piston rod of the strut. This bumper prevents the cylinder of the strut assembly from impacting heavily the mounting assembly. The bumpers could also be mounted in other locations, as shown in U.S. Pat. No. 5,725,203, where the bumper is free standing to prevent a control arm of the suspension from impacting with the vehicle frame.

Bumpers can be mounted in a free state or within a rigid cup. U.S. Pat. No. 6,158,726 discloses a bumper with the use of a rigid cup attached. The rigid cup acts to attach the bumper to the vehicle or the strut and limits the bumper distortion, thereby increasing its rate. The force necessary to compress the bumper increases as the bumper is compressed and the bumper absorbs energy as it is compressing. As the bumper is compressed, the resistance to compression increases to the point where the bumper acts as a solid, and transfers the remaining energy from the impact to the vehicle. The use of a rigid cup or another constraint limits the bulging of the bumper, thereby reducing the amount of travel needed to reach the point where the bumper becomes a solid.

In general, when more energy must be removed, a larger bumper is used. Recent styling trends are dictating the use of low profile tires, which in effect removes an important energy management element. To counteract the loss of the cushioning given by higher profile tires, the jounce bumpers must absorb much greater amounts of energy. In most cases, there is not enough space to package a bumper large enough to absorb the amount of energy experience during an impact.

SUMMARY OF INVENTION

One object of the invention is to provide a bumper assembly which overcomes the limiting effect a rigid cup has on a bumper assembly. Another object of the invention is to provide a compact bumper assembly capable of absorbing a larger amount of energy than a similar sized bumper assembly, and provide more travel of the strut assembly.

These and other problems are overcome by a bumper assembly comprising a microcellular urethane (MCU) jounce bumper placed into a thermoplastic urethane (TPU) cup. The MCU bumper is partially placed within the TPU cup, which is attached to a surface of either a strut assembly or is free standing in another assembly. As a force acts upon the MCU bumper, it begins to press into the TPU cup. Upon an increasing force being applied, the TPU cup begins to expand outwardly at its opening at the same time the MCU bumper compresses within the TPU cup. Thus, the combination of the bumper and the cup act in unison to receive the force, and allow more travel of the strut assembly as the cup expands. As a result, the combination bumper assembly is capable of absorbing an increased amount of energy in a compact area while still allowing more travel of the strut assembly.

BRIEF DESCRIPTION OF THE DRAWINGS

A preferred embodiment of the invention will now be described with reference to the accompanying drawings, in which.

DETAILED DESCRIPTION OF THE PREFERRED EMBODIMENT

Figure 3:
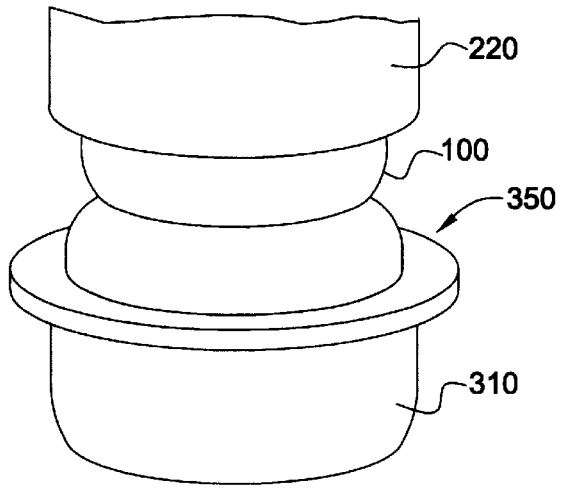
FIGS. 3, 3A and 3B are front views of a prior art bumper using a rigid cup and its reaction on application of a force.
Figure 3A:
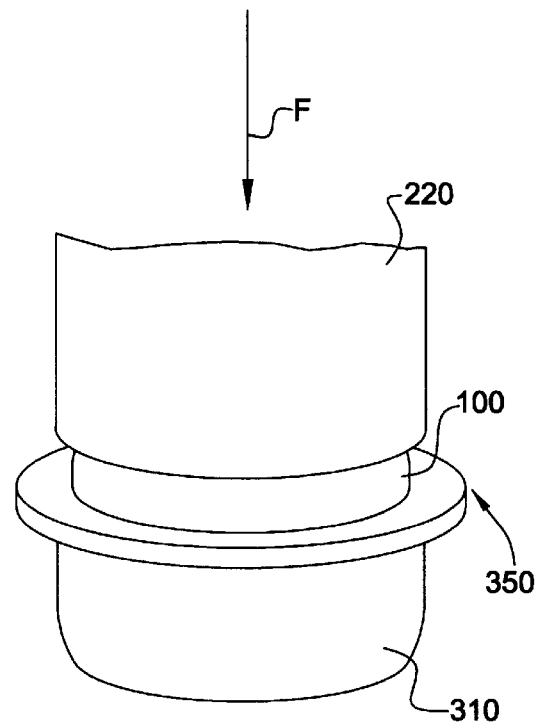
Figure 3B:
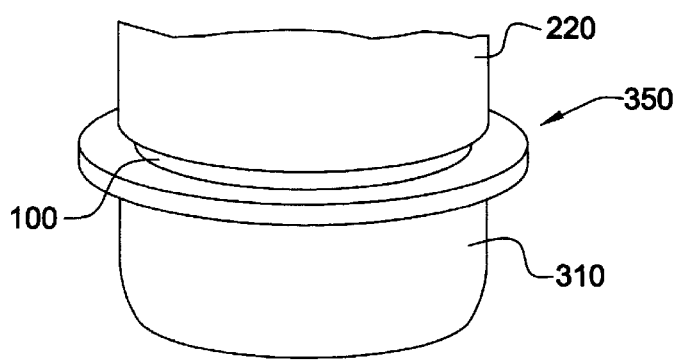

When the vehicle travels over a bump, a strut assembly collapses to absorb the shock. Upon incurring a force greater than the force the strut can handle, the strut will bottom out, or completely collapse. Bumper assemblies provide a cushion between the cylinder of the strut and the surface to which the strut is attached. In some strut assemblies, a rigid cup is used to mount the bumper, as shown in FIGS. 3, 3A and 3B. The bumper assembly 350 consists of a rod portion 220, a compressible bumper 100 and a rigid cup 310. In typical circumstances, rod portion 220 is the cylindrical tube of the strut assembly, bumper 100 is made of some compressible material to absorb the shock of the bump and rigid cup 310 holds bumper 100 and is connected to the cylinder of a strut (not shown) or is connected to a surface (not shown) to prevent rod portion 220 from impacting the surface or cylinder.

The bump incurred in effect imposes a force upon the bumper assembly 350 in the direction F shown in FIG. 3A. The force in direction F causes bumper 100 to increasingly compress as the amount of force increases. Any bumper has a certain amount of force over which it will not compress further. If that force is achieved with bumper 100, it will not compress further into cup 310, providing a maximum amount of energy bumper assembly 350 will absorb. Further, the bumper assembly will provide a maximum amount of travel of the strut assembly. FIG. 3B shows bumper assembly 350 at a maximum collapsed state. The bumper 100 has completely compressed within the rigid cup 310. The rod 220 cannot move any further toward rigid cup 310. Any force in direction F applied to the bumper assembly that is greater than the amount need to completely compress the bumper 100 is transferred directly to the vehicle.

Figure 5A:
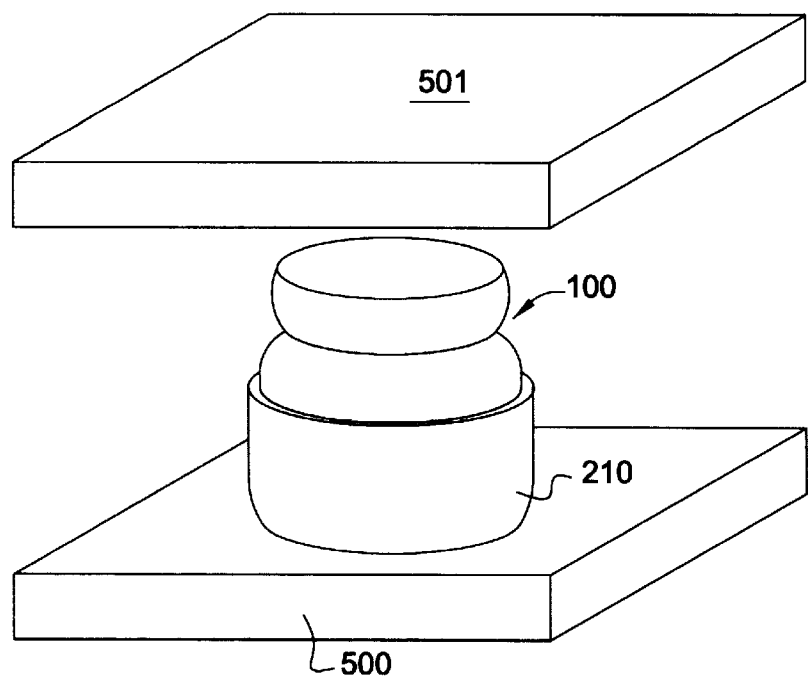
FIG. 5A is a perspective view of a preferred embodiment of the present invention located between a pair of opposing objects.
Figure 5B:
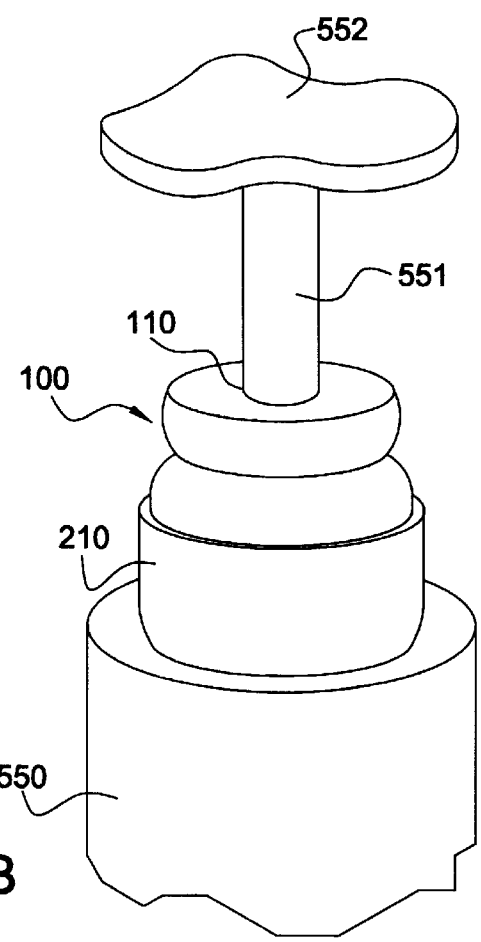
FIG. 5B is a perspective view of a preferred embodiment of the present invention located within a strut assembly.

FIGS. 1, 2, 2A and 2B illustrate bumper assembly 250 embodying the present invention. It consists of rod portion 220, a bumper 100 and flexible cup 210. Bumper 100 can be made of microcellular urethane (MCU) or an equivalent shock absorbing material. It has a configuration designed to cause it to collapse into the flexible cup 210. Bumper 100 also has an aperture 110 for allowing the shaft of a strut to pass through it which allows the bumper to maintain perfect alignment with the strut, consisting of strut shaft 551 and strut cylinder 550, and frame member 552 (only a portion of which is shown), as shown in FIG. 5B. An arrangement similar to this arrangement is shown in reference to U.S. Pat. No. 5,487,535, described above. If bumper assembly 250 is free standing without being mounted onto a strut, as discussed above with reference to U.S. Pat. No. 7,725,203 where the bumper assembly is located between a control arm of the suspension and the vehicle frame, bumper 100 may not have aperture 110. As shown in FIG. 5A, a second member 501 is displaceable relative to a first member 500 with the combination of bumper 100 and flexible cup 210 preventing contact between the first and second member 500 and 501.

Flexible cup 210 is used to hold bumper 100 and to attach bumper assembly 250 to either a strut assembly or any surface to which the bumper assembly 250 is to be attached. Flexible cup 210 is preferably made of thermoplastic urethane (TPU), but can be made of other materials with similar features. The advantage of using such a flexible cup design is its ability to expand upon application of sufficient force.

Figure 1:
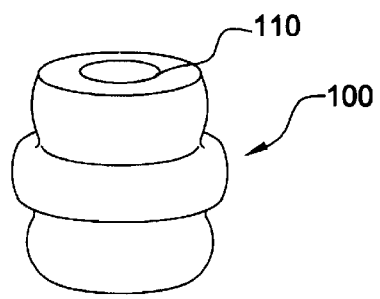
FIG. 1 is a perspective view of a MCU bumper.
Figure 2:
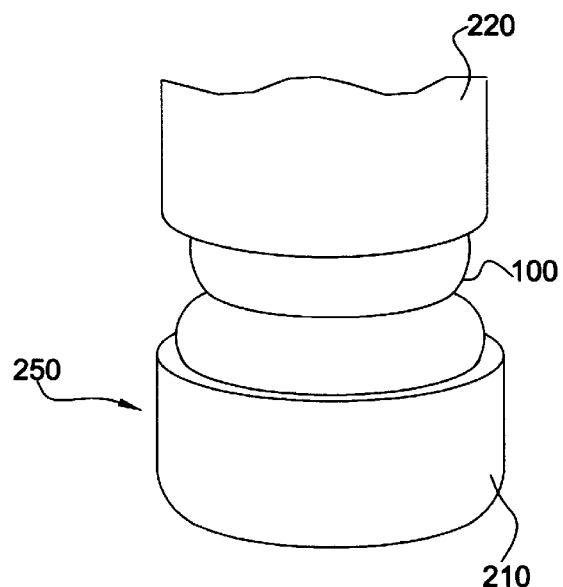
FIGS. 2, 2A and 2B are perspective views of the combination TPU cup and MCU bumper of the present invention within a strut assembly illustrating the sequential compression of the bumper and cup upon the application of a force.
Figure 2A:
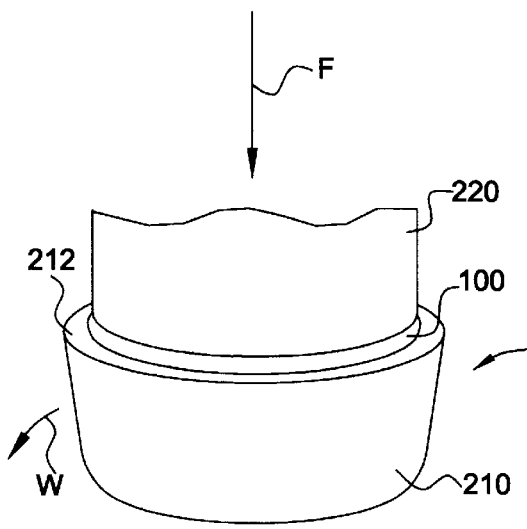
Figure 2B:
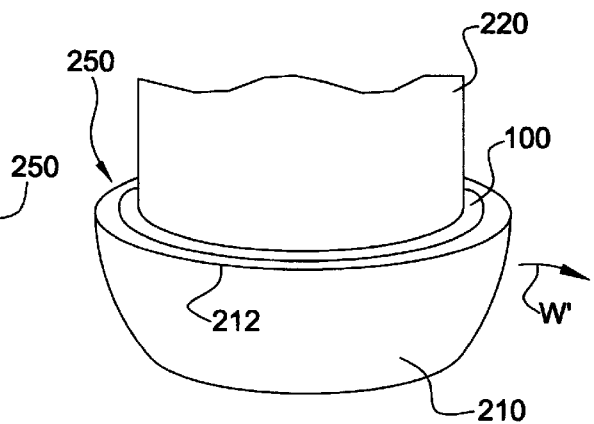

The sequence of operation is of bumper assembly 250 is shown in FIGS. 2, 2A and 2B. Rod portion 220 is in alignment with flexible cup 210 with bumper 100 there between. When rod 220 applies a force upon bumper assembly 250 in the direction F, bumper 100 begins to compress and thus collapse into flexible cup 210. As the amount of force increases, bumper 100 further compresses and flexible cup 210 begins to expand outwardly at its mouth 212 in the direction W. Thus, both bumper 100 and flexible cup 210 react to the force applied on bumper assembly 250. Upon application of a force greater than the force required to completely compress bumper 100, bumper assembly 250 allows for the rod portion to travel further in the direction F, as is shown in FIG. 2B (compare to FIG. 3B). Bumper assembly 250 is also capable of absorbing greater energy as both bumper 100 and flexible cup 210 absorb energy from the rod portion 220.

Figure 4:
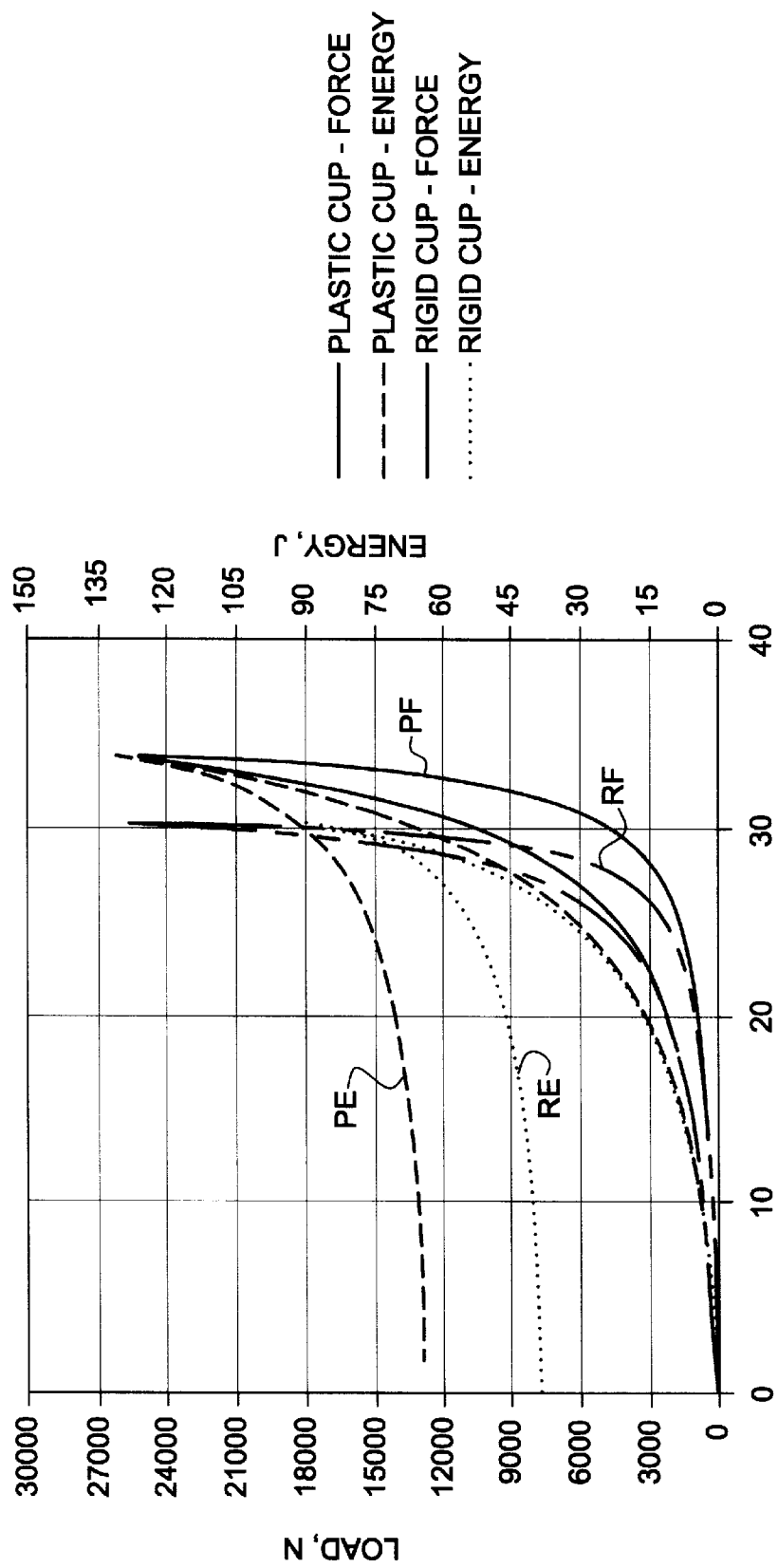
FIG. 4 is a graph illustrating a comparison of the increase in energy absorbance of and the increase of travel allowed by the present invention.

FIG. 4 shows a graph demonstrating the utility of the present invention. A bumper assembly using a rigid cup and a bumper assembly using a flexible cup were each compressed under similar conditions and the results were recorded. The graphs reflect the results of the same bumper 100 being compressed into rigid cup 310 and flexible cup 210. The graphs show both the energy deflection and the load deflection using a 25 kN force and reversing the force.

After a test run using the rigid cup 310, rod member 220 was able to travel about 30 mm following initial contact with bumper 100 under a constant force of 25 kN as illustrated by line RF. Under the same operating conditions but using flexible cup 210, rod member 220 traveled 33 mm, as illustrated by line PF. The use of flexible cup 210 allows about 10% more travel of rod member 220.

During the same test procedure, the amount of energy the bumper assemblies absorbed was also recorded. Rigid cup 310 was capable of absorbing 90 J during the trial, as illustrated by line RE. Again under the same operating conditions but using, flexible cup 210, the bumper assembly 250 is capable of absorbing about 125 J, as illustrated by line PE. The use of the flexible cup provides the ability to absorb about 38% more energy.

Thus, the use of the bumper assembly 250 including bumper 100 and flexible cup 210 provides substantially more travel for cushioning and can absorb substantially more energy than bumper assembly 350 using a rigid cup 310 even though both assemblies have essentially the same configuration. When using rigid cup 310 in bumper assembly 350, bumper 100 is completely collapsed under the force of 25 kN, which is shown in the graphs by the difference between the amounts of energy absorbed. As bumper 100 was completely collapsed, the excess energy (35 kN) is transferred to the vehicle. However, bumper assembly 250 with flexible cup 210, still capable of absorbing the 35 kN, is in effect able to withstand about a 38% greater impact than bumper assembly 350.

The foregoing describes an embodiment of a bumper assembly for use in a strut assembly. The invention may be used in other assemblies or forms, such as a free standing bumper, or used in a differing manner within the strut assembly. Further, other embodiments of the present invention, and obvious modifications to those skilled in the art can be made without departing from the scope of the present invention.

I claim:

1. A jounce bumper assembly for a wheel suspension system of a vehicle including a frame member and a strut member displaceable relative to said frame member along a line of travel, comprising:

a first flexible member disposed between said frame and said strut members along said line of travel, having a recess and an annular portion surrounding said recess therein aligned with said line of travel; and a second compressible member disposed between said strut and said first flexible member, having a portion thereof received within and seated in said recess, wherein upon a force applied along said line of travel, said second compressible member collapses into said recess causing said annular portion to expand radially.

2. A jounce bumper assembly according to claim 1 wherein said recess of said first flexible member and said portion of said second compressible member are provided with complementary, arcuate surfaces.

3. A jounce bumper assembly according to claim 2 wherein said second compressible member includes a longitudinal axis aligned with said line of travel and a radius of said recess of said first flexible member.

4. A jounce bumper assembly according to claim 3 wherein said second compressible member has an aperture along said longitudinal axis through which a shaft of said strut member passes.

5. A jounce bumper assembly according to claim 1 wherein said second compressible member is microcellular urethane.

6. A jounce bumper assembly according to claim 1 wherein said first flexible member is thermoplastic urethane.

7. A jounce bumper for a wheel suspension system of a vehicle including a first member and a second member displaceable relative to said first member along a line of travel, comprising:

a first flexible member disposed between said first and second member along said line of travel having a recess and an annular portion surrounding said recess therein aligned with said line of travel; and a second compressible member disposed between said first member and said first flexible member, having a portion thereof received within and seated in said recess, wherein upon a force applied along said line of travel between, said second compressible member collapses into said recess causing said annular portion to expand radially.

8. A jounce bumper assembly according to claim 7 wherein said recess of said first flexible member and said portion of said second compressible member are provided with complementary, arcuate surfaces.

9. A jounce bumper assembly according to claim 8 wherein said second compressible member includes a longitudinal axis aligned with said line of travel and a radius of said recess of said first flexible member.

10. A jounce bumper assembly according to claim 9 wherein said second compressible member compresses into said recess upon application of a force along said line of travel.

11. A jounce bumper assembly according to claim 7 wherein said second compressible member is microcellular urethane.

12. A jounce bumper assembly according to claim 7 wherein said first flexible member is thermoplastic urethane.

13. A jounce bumper assembly according to claim 7 wherein one of said first and second members is a control arm of said suspension system and the other of said first and second members is a frame of said motor vehicle.

14. An energy absorption device including a first member and a second member displaceable along a line of travel comprising:

a flexible member disposed between said first and second member along said line of travel having a recess portion and an annular portion surrounding said recess portion; and a compressible member disposed along said line of travel and having a portion thereof received in said recess, wherein upon a force applied along said line of travel, said second compressible member collapses into said recess causing said annular portion to expand radially.

15. An energy absorption device according to claim 14 wherein said recess of said flexible member and said portion of said compressible member are provided with complimentary, arcuate surfaces.

16. An energy absorption device according to claim 14 wherein said compressible member compresses into said recess of said flexible member upon application of a force along said line of travel.

17. An energy absorption device according to claim 14 wherein said flexible member is thermoplastic urethane and said compressible member is microcellular urethane.

* * * * *